(12) United States Patent
Lee (10) Patent No.: US 11,338,701 B2
(45) Date of Patent: May 24, 2022

(54) ECO-FRIENDLY VEHICLE AND METHOD OF PROVIDING GUIDANCE FOR CHARGING AMOUNT

(71) Applicants: HYUNDAI MOTOR COMPANY, Seoul (KR); KIA MOTORS CORPORATION, Seoul (KR)

(72) Inventor: Jea Mun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 225 days.

(21) Appl. No.: 16/699,950

(22) Filed: Dec. 2, 2019

(65) Prior Publication Data
US 2020/0391612 A1 Dec. 17, 2020

(30) Foreign Application Priority Data

Jun. 14, 2019 (KR) .................. 10-2019-0070550

(51) Int. Cl.
*B60L 58/13* (2019.01)
*B60W 40/04* (2006.01)
*G01C 21/34* (2006.01)

(52) U.S. Cl.
CPC ............. *B60L 58/13* (2019.02); *B60W 40/04* (2013.01); *G01C 21/3469* (2013.01); *B60W 2510/244* (2013.01)

(58) Field of Classification Search
CPC ...... B60L 58/13; B60L 2240/12; B60L 50/16; B60L 2240/642; B60L 2250/16; B60L 2240/68; B60L 58/12; B60L 53/665; B60L 2260/54; B60L 2250/14; B60W 40/04; B60W 2510/244; B60W 20/13; B60W 10/26; B60W 40/076; B60W 2554/00; B60W 2552/15; G01C 21/3469; Y02T 10/72; Y02T 90/16; Y02T 90/12; Y02T 10/7072; Y02T 10/70; Y02T 10/62; B60Y 2200/92; B60Y 2200/91
See application file for complete search history.

(56) References Cited

PUBLICATIONS

Machine translation of JP2013/177089 (Year: 2013).*

* cited by examiner

*Primary Examiner* — Alan D Hutchinson
(74) *Attorney, Agent, or Firm* — Morgan, Lewis & Bockius LLP

(57) ABSTRACT

A method of providing guidance for a charging amount of an eco-friendly vehicle includes: predicting a driving energy for each section of a predicted travel route that is divided by a plurality of sections; calculating a battery input and output energy for each section based on the driving energy for each section; and determining a start SoC for minimizing a total change amount of a SoC that is sequentially changed in a section order when driving along the predicted travel route by applying a charge and discharge efficiency depending on a current SoC of a battery at each section to the battery input and output energy for each section.

15 Claims, 9 Drawing Sheets

FIG. 1

-PRIOR ART-

FIG. 9

ECO-FRIENDLY VEHICLE AND METHOD OF PROVIDING GUIDANCE FOR CHARGING AMOUNT

CROSS-REFERENCE TO RELATED APPLICATION(S)

This application claims the benefit of Korean Patent Application No. 10-2019-0070550, filed on Jun. 14, 2019, which is hereby incorporated in its entirety by reference as if fully set forth herein.

TECHNICAL FIELD

The present disclosure relates to an eco-friendly vehicle and a method of providing guidance for a charging amount therefor for providing guidance for achieving a target charging amount in consideration of the charge and discharge efficiency of a battery when the battery for supplying power to a driving motor is charged with external power.

BACKGROUND

Recently, as interest in the environment increases, there has been a great deal of research on hybrid electric vehicles (HEV) and electric motors, which use an electric motor as a driving source.

A hybrid electric vehicle (HEV) is a vehicle that uses two power sources, typically an engine and an electric motor. An HEV has excellent fuel efficiency and engine performance compared with a vehicle having only an internal combustion engine and is also advantageous for lowering emissions, and thus has been actively developed recently. In particular, an HEV for charging a battery with external power via a plug instead of engine power or regenerative braking is referred to as a plug-in hybrid electric vehicle (PHEV). In the case of an EV, it is not possible to autonomously generate electricity except for regenerative braking, unlike an HEV, and thus charging with external power is required.

A battery installed in an eco-friendly vehicle including a driving motor is characterized in that charge and discharge efficiency changes depending on a state of charge (SoC). Accordingly, even if a battery is discharged to enable the constant supply of energy to a driving motor or constantly receives energy from the driving motor, charge and discharge efficiency is changed depending on a section of SoC, and thus the increase or decrease in SoC is changed, which will be described with reference to FIG. 1.

Figure 1:
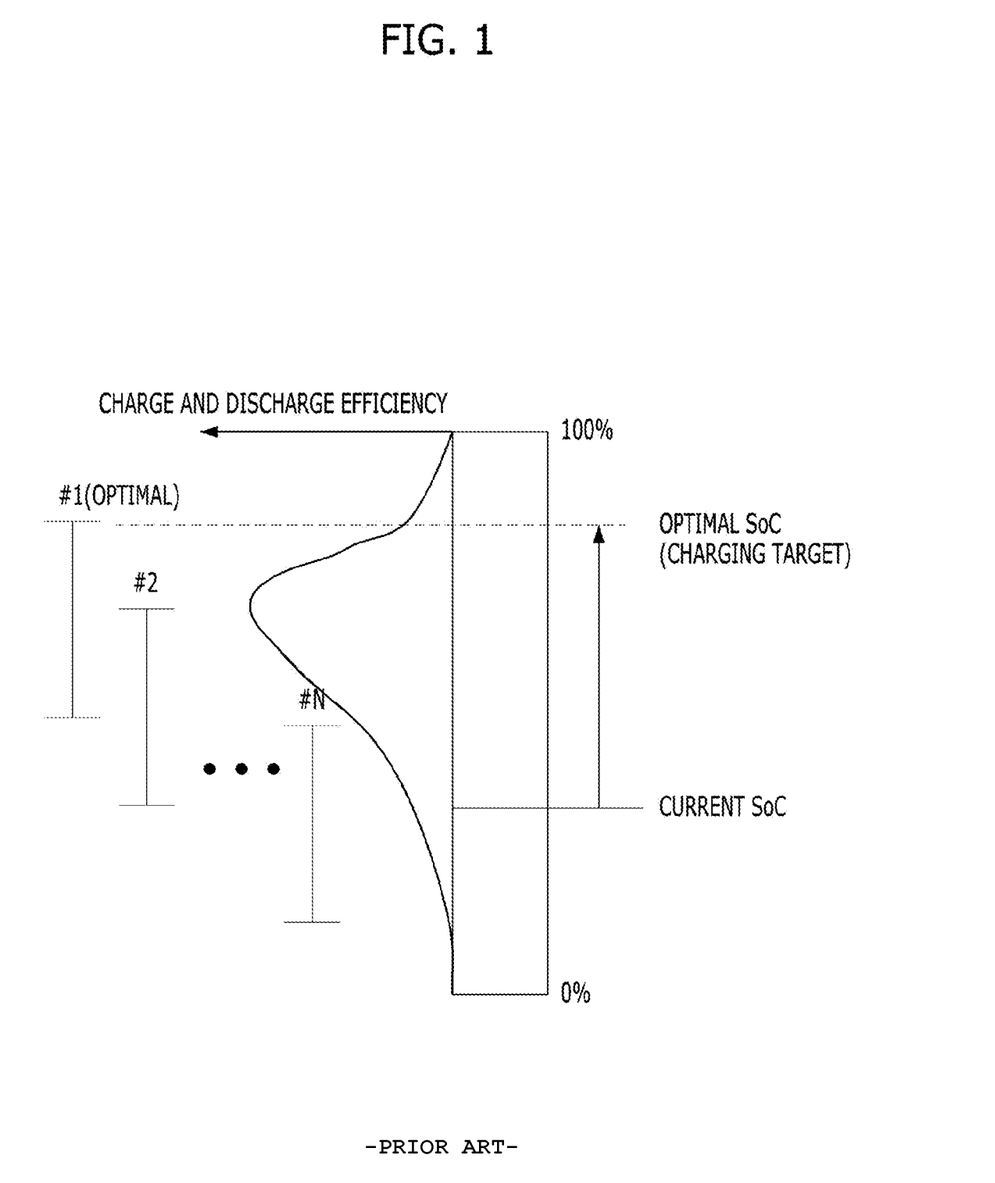
FIG. 1 is a diagram for explanation of charge and discharge efficiency for each section of a state of charge (SoC) of a battery.

FIG. 1 is a diagram for explanation of charge and discharge efficiency for each section of an SoC of a battery.

Referring to FIG. 1, the vertical direction indicates the SoC of the battery and the horizontal direction indicates the charge and discharge efficiency of the battery. The charge and discharge efficiency of the battery is unique characteristics of the battery and is different for each battery, but a lithium ion battery installed in a general eco-friendly vehicle has an optimal SoC between about 60 to about 80%, which is the highest charge and discharge efficiency. Accordingly, when constant energy is supplied to the outside (i.e., discharge), if discharge begins in section #1, SoC consumption rate is lower than the case in which discharge begins in section #2. As a result, it is efficient to start discharging in an optimal SoC to which charge and discharge efficiency of section #1 is applied compared with the case in which constant energy is supplied to the outside in the current SoC, and thus it is desirable that a driver start driving after a battery is charged to the optimal SoC.

However, a general eco-friendly vehicle does not provide guidance for achieving such an optimal SoC, and the used region of a battery is generally determined according to the charging habits of the driver and a travel route. That is, a user who travels a relatively short distance but prefers a full charge mainly uses only a high SoC section of a battery, and a user who maintains a low charging amount mainly uses only a low SoC section of the battery, and thus there is a problem in terms of inefficient use of the battery.

SUMMARY

An object of the present disclosure is to provide an eco-friendly vehicle and a method of providing guidance for a charging amount therefor for more effectively providing guidance for achieving a target charging amount.

In particular, the present disclosure embodies an eco-friendly vehicle and a method of providing guidance for a charging amount therefor for providing guidance for achieving a target charging amount in consideration of a travel route and charge and discharge efficiency for each SoC of a battery.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to an aspect of the present disclosure, a method of providing guidance for a charging amount of an eco-friendly vehicle includes: predicting a driving energy for each section of a predicted travel route that is divided by a plurality of sections; calculating a battery input and output energy for each section based on the driving energy for each section; and determining a start SoC for minimizing a total change amount of an SoC that is sequentially changed in a section order when driving along the predicted travel route by applying a charge and discharge efficiency depending on a current SoC of a battery at each section to the battery input and output energy for each section.

In another aspect of the present disclosure, an apparatus for providing guidance for a charging amount of an eco-friendly vehicle, the apparatus comprising a controller configured to: predict a driving energy for each section of a predicted travel route that is divided by a plurality of sections, calculate a battery input and output energy for each section of the predicted travel route based on the driving energy for each section, and determine a start SoC for minimizing a total change amount of an SoC that is sequentially changed in a section order when driving along the predicted travel route by applying a charge and discharge efficiency depending on a current SoC of a battery at each section to the battery input and output energy for each section.

In another aspect of the present disclosure, an eco-friendly vehicle includes: predict a driving energy for each section of a predicted travel route that is divided by a plurality of sections, calculate a battery input and output energy for each section of the predicted travel route based on the driving energy for each section, determine a start SoC for minimizing a total change amount of a SoC that is sequentially changed in a section order when driving along the predicted travel route by applying a charge and discharge efficiency depending on a current SoC of a battery at each section to the battery input and output energy for each section, and control to output information on the start SoC.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

Prior to a description of a method of providing guidance for a charging amount according to an exemplary embodiment of the present disclosure, the configuration and control system of a hybrid vehicle as an example of an eco-friendly vehicle applicable to exemplary embodiments will be described with reference to FIGS. 2 and 3. It will be obvious to one of ordinary skill in the art that the configuration of a vehicle described below with reference to FIGS. 2 and 3 is also similarly applied to an electric vehicle (EV) except for parts related to an internal combustion engine.

Figure 2:
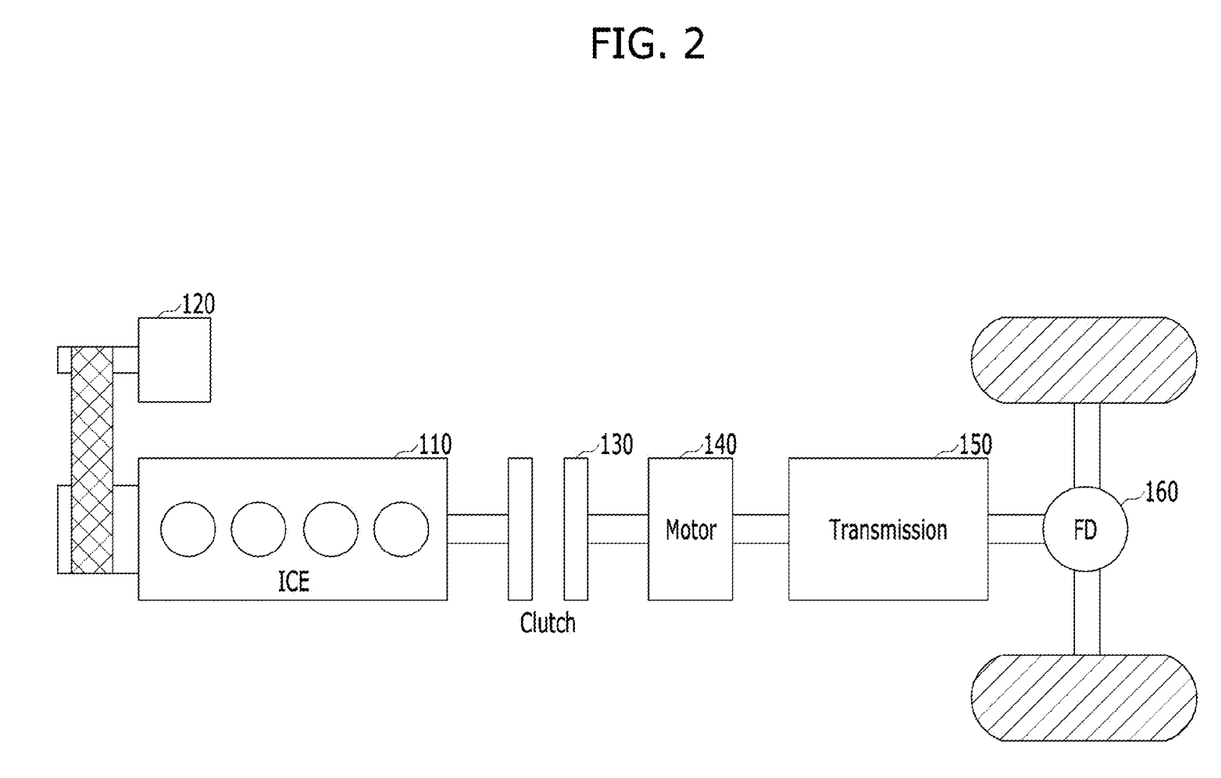
FIG. 2 is a diagram showing an example of the configuration of a hybrid vehicle applicable to an exemplary embodiment of the present disclosure.
Figure 3:
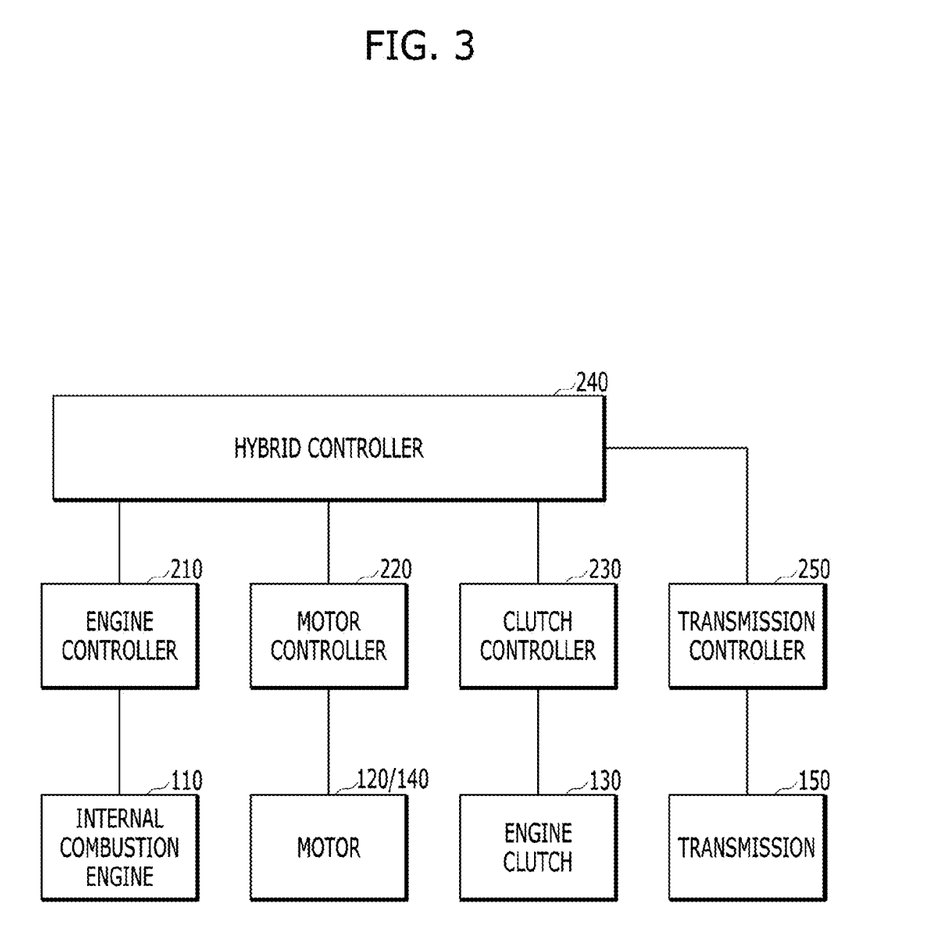
FIG. 3 is a block diagram showing an example of a control system of a hybrid vehicle applicable to an exemplary embodiment of the present disclosure.

FIG. 2 is a diagram showing an example of the configuration of a hybrid vehicle applicable to an exemplary embodiment of the present disclosure.

Referring to FIG. 2, a hybrid vehicle according to an exemplary embodiment may include a parallel type or transmission mounted electric drive (TMED) hybrid powertrain including an electric motor 140 (or a driving motor) and an engine clutch (EC) 130 that are installed between an internal combustion engine (ICE) 110 and a transmission 150.

In such a vehicle, in general, when a driver presses an accelerator after starting the vehicle, the motor 140 (or a driving motor) is driven using power of a battery (not shown) while the engine clutch 130 is open and transmits power to move wheels through the transmission 150 and a final drive (FD) 160 (i.e., EV mode). The term "final drive" may embody an assembly of gears in a rear axle of rear-wheel drive vehicles and in a front axle of front-wheel drive vehicles. As the vehicle gradually accelerates, high traction force is further required, in which case a starter generator motor 120 may be operated to drive the engine 110.

Accordingly, when the rotational speeds of the engine 110 and the motor 140 are the same as each other, the engine clutch 130 is then engaged such that both the engine 110 and the motor 140 drive the vehicle (i.e., transition to an HEV mode from an EV mode). When a predetermined engine off condition, such as vehicle deceleration, is satisfied, the engine clutch 130 is opened and the engine 110 stops (i.e., transition to an EV mode from an HEV mode). In addition, the hybrid vehicle converts traction force of a wheel into electric energy to recharge the battery, which is referred to as braking energy regeneration or regenerative braking.

The starter generator motor 120 functions as a starter motor when the engine is turned on and functions as a generator after the engine is turned on or when rotational energy is recovered during engine off, and thus, the starter generator motor 120 may also be referred to as a hybrid starter generator (HSG), and as necessary, may be referred to as an auxiliary motor.

FIG. 3 is a block diagram showing an example of a control system of a hybrid vehicle applicable to an exemplary embodiment of the present disclosure. The control system shown in FIG. 3 may be applied to a vehicle to which the powertrain described above with reference to FIG. 2 is applied.

Referring to FIG. 3, in the hybrid vehicle to which embodiments of the present disclosure are applicable, the internal combustion engine 110 may be controlled by an engine controller 210, the torque of the starter generator motor 120 and the driving motor 140 may be controlled by a motor control unit (MCU) 220, and the engine clutch 130 may be controlled by a clutch controller 230. Here, the engine controller 210 may also be referred to as an engine management system (EMS). In addition, the transmission 150 may be controlled by a transmission controller 250. As necessary, the starter generator motor 120 and the driving motor 140 may be controlled by different separate motor controllers.

Each controller may be connected to a hybrid control unit (HCU) 240 for controlling an overall mode-switching procedure as a high-level controller and may provide, to the hybrid controller 240, information required to switch driving modes and to control an engine clutch during gear shifting, and/or information required to control engine off, or may perform an operation according to a control signal under the control of the hybrid controller 240.

For example, the hybrid controller 240 may control the entire powertrain with regard to vehicle driving. For example, the hybrid controller may determine an open time of the engine clutch (EC) 130 and may control hydraulic pressure (in the case of a wet EC) or control torque capacity (in the case of a dry EC) when the EC is open. The hybrid controller 240 may determine an EC state (lock-up, slip, open, etc.) and may control a time for stoppage of fuel injection of the engine 110. The hybrid controller may transmit a torque command for controlling torque of the starter generator motor 120 to the MCU 220 to control engine off and may control engine rotational energy recovery. In addition, in order to provide guidance for achieving a target charging amount when a vehicle travels along a forward route according to embodiments of the present disclosure to be described below, the hybrid controller 240 may determine the energy to be input to a battery or to be discharged from the battery and may determine a target charging amount by which a section having optimal charge and discharge efficiency is capable of being used, based on the determined energy.

One of ordinary skill in the art would recognize that the aforementioned relationship between the controllers and functions/divisions of the controllers are exemplary, and thus, the present disclosure is not limited to the terms. For example, the hybrid controller 240 may be embodied by allowing any one of controllers other than the hybrid controller 240 to provide a corresponding function, or two or more other controllers may provide the corresponding function in a distributed manner.

Hereinafter, a method of more effectively providing guidance for a charging amount and the configuration of a vehicle therefor according to an exemplary embodiment of the present disclosure will be described based on the aforementioned configuration of the vehicle.

Figure 4:
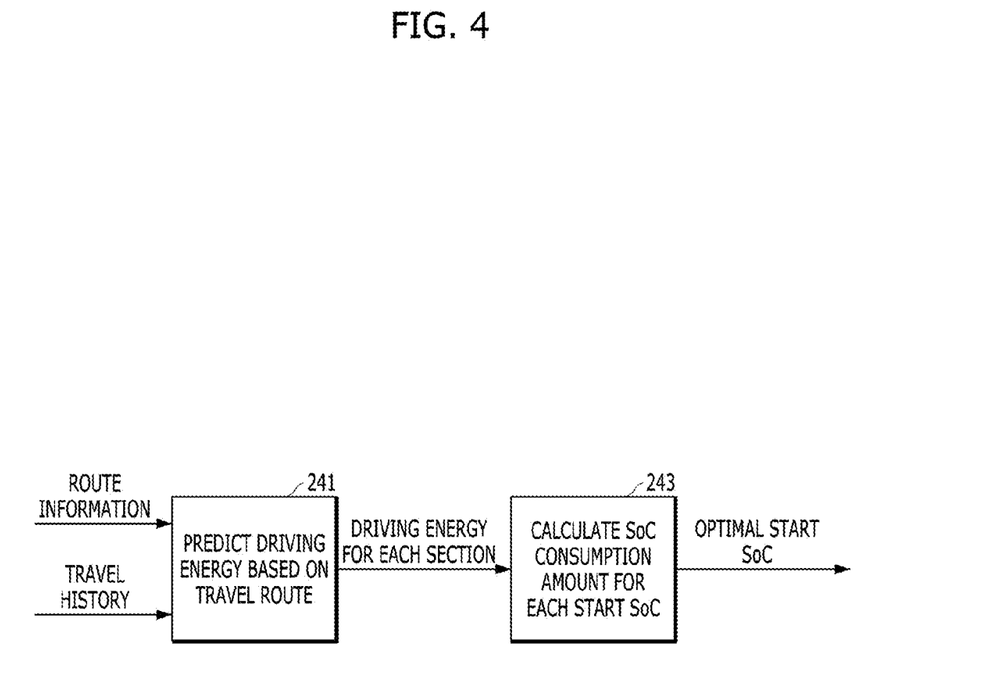
FIG. 4 is a diagram showing an example of the configuration of a controller for determining an optimal target charging amount according to an exemplary embodiment of the present disclosure.

FIG. 4 is a diagram showing an example of the configuration of a controller for determining an optimal target charging amount according to an exemplary embodiment of the present disclosure.

In the following drawings including FIG. 4 and the following description, a controller for determining an optimal target charging amount is assumed to be the hybrid controller 240. However, this is merely exemplary and the present disclosure is not limited thereto. For example, the controller for determining the optimal target charging amount may be an audio/video/navigation (AVN) system or may be a vehicle control unit (VCU) in the case of an electric vehicle (EV).

The configuration of the controller shown in FIG. 4 may particularly be applied to an EV mode or a charge depleting (CD) mode of a hybrid vehicle or an electric vehicle (EV). Referring to FIG. 4, the hybrid controller 240 may include a driving energy calculating processor 241 and a State of Charge (SoC) determining processor 243.

The driving energy calculating processor 241 may take at least one of route information or a travel history as input information and may predict the amount of energy consumed to travel along a predicted travel route based on the information. Prediction of travel energy may be performed differently depending on the amount of related information on the predicted travel route. For example, when there is only past travel history data, the energy predicted to be used may be obtained by multiplying an average travel distance and average fuel efficiency or may be average energy used per a single charge. In another example, when there is only information on a destination or information on a distance to the destination, the energy predicted to be used may be obtained by multiplying the distance by average fuel efficiency. In another example, when both a destination and predicted load information (e.g., an average speed or slope for each section) are known, a method in which a route is divided into a plurality of sections according to (average) driving load based on a speed and a slope, the energy predicted to be used in each section is predicted based on the section speed, the section distance, the section slope, or the like, and then the predicted values are summed may be applied.

Figure 5A:
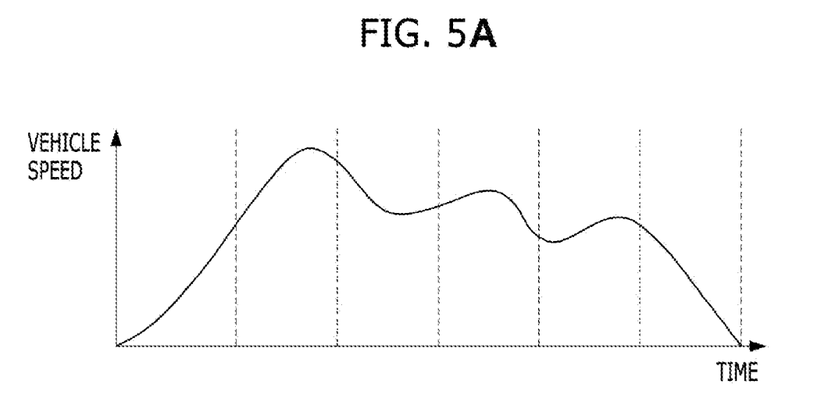
FIGS. 5A and 5B are diagrams showing an example of dividing a predicted travel route based on vehicle speed and driving power, respectively, according to an exemplary embodiment of the present disclosure.
Figure 5B:
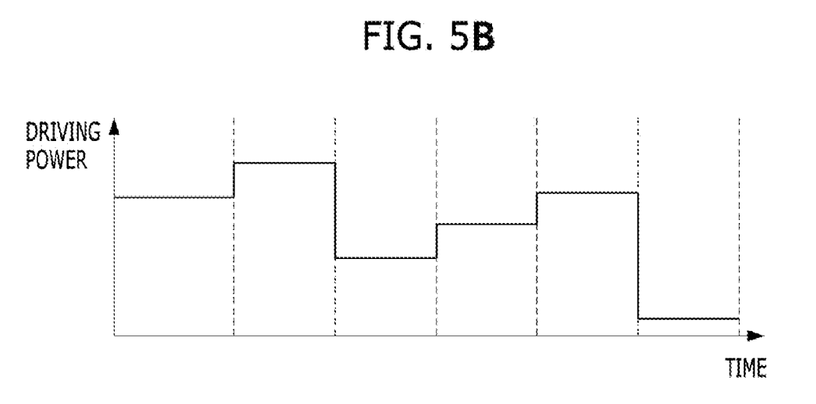

An example of a section dividing method depending on vehicle speed is shown in FIGS. 5A and 5B. FIGS. 5A and 5B are diagrams showing an example of dividing a predicted travel route based on vehicle speed and driving power, respectively, according to an exemplary embodiment of the present disclosure.

FIG. 5A shows the case in which a predicted travel route is divided into a plurality of sections depending on vehicle speed in a predicted travel route based on traffic information, and FIG. 5B shows the case in which the predicted travel route is divided into a plurality of sections depending on average driving power for satisfying corresponding vehicle speed when the vehicle speed is considered as a driving load. The graphs shown in FIGS. 5A and 5B are given in consideration only of vehicle speed, and it will be obvious to one of ordinary skill in the art that the predicted travel route is divisible in different forms when a slope is further considered.

When the driving energy calculating processor 241 obtains energy predicted to be used for a predicted travel route, the SoC determining processor 243 may determine an SoC when a vehicle begins to travel, in which an SoC section with the highest charge and discharge efficiency of a battery based on the energy predicted to be used is capable of being used, i.e., an optimal start SoC. The optimal start SoC may be guided as an optimal target charging amount to a user.

Figure 6:
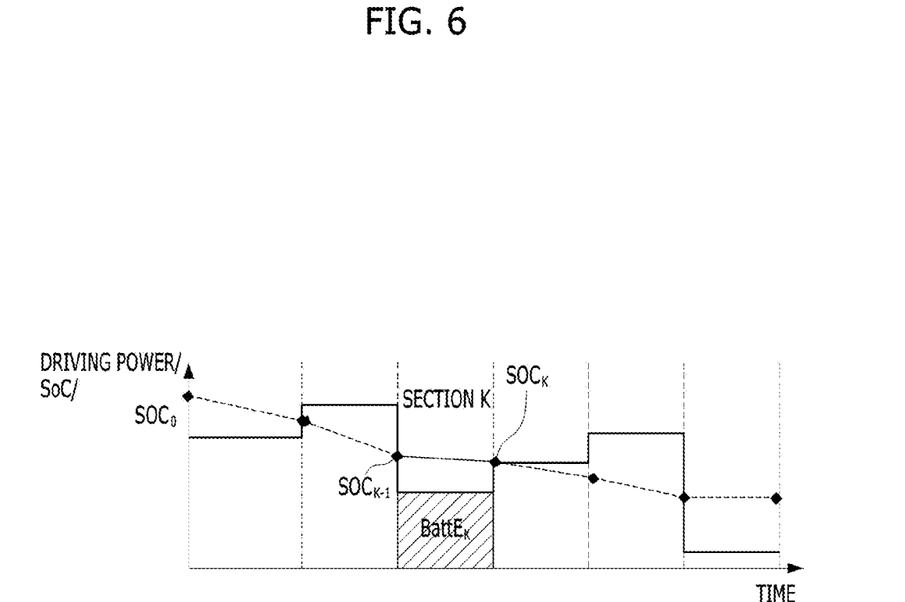
FIG. 6 is a diagram for explanation of change in an SoC of a battery based on sequential consumption of energy predicted to be used in each section according to an exemplary embodiment of the present disclosure.

For example, when the driving energy calculating processor 241 calculates the energy predicted to be used in each section in the predicted travel route, the SoC determining processor 243 may calculate SoC consumption amounts for respective sections when the energy predicted to be used is sequentially discharged from a battery while a start SoC is changed and may determine the start SoC with the lowest SoC consumption amount, among the calculated SoC consumption amounts, as an optimal start SoC, which will be described with reference to FIG. 6.

FIG. 6 is a diagram for explanation of change in an SoC of a battery based on consumption of energy predicted to be used in each section according to an exemplary embodiment of the present disclosure.

In a graph of FIG. 6, the horizontal axis indicates time and the vertical axis indicates driving power and a battery SoC for each section. Here, $SoC_K$ represents the SoC when a $K^{th}$ section is terminated and $SoC_0$ represents a start SoC. Accordingly, $SoC_{K-1}$ may correspond to an SoC when the $K^{th}$ section begins. In addition, $BattE_K$ represents battery input and output energy in the $K^{th}$ section. Similar to FIG. 4, an EV mode of an electric vehicle or a hybrid vehicle is assumed when driving along a predicted travel route, and thus, the driving power may exactly correspond to output power of a battery, and the battery input and output energy (i.e., an area for each section in the graph) for each section may exactly correspond to the energy that is discharged from the battery and is output to the outside.

Accordingly, the charge and discharge efficiency of a battery can be calculated in consideration of only discharge, and thus energy that is consumed in an actual battery when corresponding energy is discharged to the outside may be obtained by multiplying the battery input and output energy BattE$_k$ by the reciprocal of the charge and discharge efficiency. For example, when the charge and discharge efficiency of a battery is 80% in the K$^{th}$ section, an SoC corresponding to energy of 1.25 kWh would be needed in an actual battery in order to supply energy of 1 kWh to a driving motor.

In summary, an SoC when the K$^{th}$ section is terminated, i.e., SOC$_K$, may be a value obtained by summing SOC$_{K-1}$, which is the last SoC when a previous (K−1)$^{th}$ section is terminated, and SoC variation in the K$^{th}$ section. In this case, the SoC variation in the K$^{th}$ section may be a value obtained by multiplying the battery input and output energy BattE$_k$ of the corresponding section by the reciprocal of the charge and discharge efficiency corresponding to SOC$_{K-1}$. As a result, SOC$_K$ may be calculated according to Equation 1 below.

$$SOC_K = SOC_{K-1} - \text{BatteryEfficiency}(SOC_{K-1}) * BattE_K \quad \text{[Equation 1]}$$

In Equation 1 above, BatteryEfficiency(SOC$_{K-1}$) represents a charge and discharge efficiency coefficient of an SoC (i.e., SOC$_{K-1}$) when the K$^{th}$ section begins. As described above, the charge and discharge efficiency coefficient may be the reciprocal of charge and discharge efficiency in a corresponding SoC when the battery is discharged. In contrast, the charge and discharge efficiency coefficient may correspond to charge and discharge efficiency in a corresponding SoC when the battery is charged. In addition, a positive sign may be applied to BattE$_k$ during discharge and a negative sign may be applied thereto during charging.

When calculating a start SoC SOC$_0$ in which a energy consumption can be minimized, the driving energy calculating processor 241 may determine a value of SOC$_0$ for minimizing Equation 2 below as an optimal start SoC. Equation 2 below represents a total SoC consumption amount obtained by summing sequential SoCs for each section when driving in a predicted travel section.

$$f(SOC_0) : \Sigma_{k=1}^n \text{BatteryEfficiency}(SOC_{K-1}) * BattE_k \quad \text{[Equation 2]}$$

The driving energy calculating processor 241 may calculate the optimal start SoC using a method of inserting a plurality of different candidate SoC$_0$ values into Equation 2 above, and may change an SoC corresponding to the greater value of a current SoC and a value managed as a preset minimum SoC to determine a candidate SoC$_0$ value in a predetermined SoC unit (e.g., 1, 3, or 5), but the present disclosure is not limited thereto.

When the optimal start SoC is calculated using the aforementioned method, the hybrid controller 240 may transmit information on the optimal start SoC to a controller for controlling an output element or directly to the output element in order to provide guidance for the optimal start SoC to a driver. The detailed output form will be described below with reference to FIG. 9.

The method of calculating the optimal start SoC has been described with reference to FIGS. 4 to 6 in terms of battery discharge. Hereinafter, a method of calculating an optimal start SoC in consideration of both charge and discharge will be described with reference to FIGS. 7 and 8.

Figure 7:
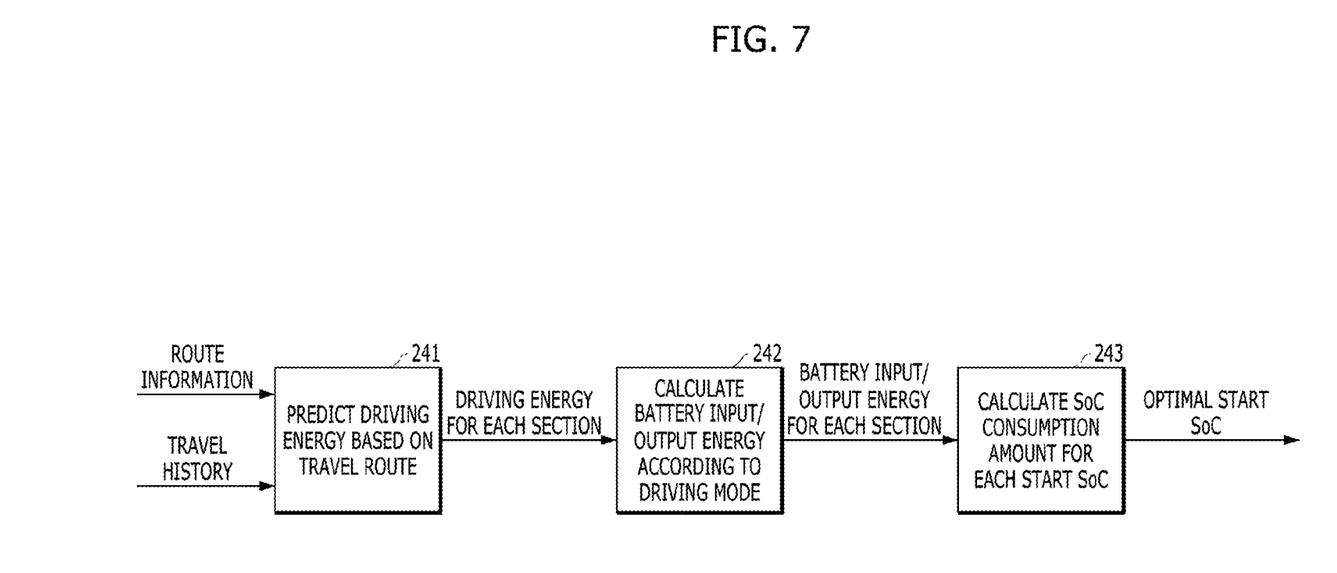
FIG. 7 is a diagram showing another example of the configuration of a controller for determining an optimal target charging amount according to an exemplary embodiment of the present disclosure.

FIG. 7 is a diagram showing another example of the configuration of a controller for determining an optimal target charging amount according to an exemplary embodiment of the present disclosure.

The configuration of the controller shown in FIG. 7 is similar to FIG. 4 except that a battery input/output energy calculating processor 242 is added, and thus a description of the configuration of the controller shown in FIG. 7 will be given in terms of differences from FIG. 4. In FIG. 4, a battery is assumed to be continuously discharged in a predicted travel route in the case of an EV/CD mode of a hybrid vehicle or an electric vehicle. In contrast, FIG. 7 illustrates the configuration in which a battery is assumed to be charged because some of engine output, which exceeds a driving load, is used to charge the battery through a motor via driving in an HEV mode of a hybrid vehicle.

Referring to FIG. 7, the function of the driving energy calculating processor 241 is the same as in the case of FIG. 4. However, when there is a section in which a vehicle travels using power of an engine, driving energy for each section may not correspond to output power of a battery for each section. For example, when a motor assist function is performed along with an engine in a specific section, partial discharge may occur, when entire driving energy is satisfied by an engine, charge/discharge may not occur, and in a section in which engine output is larger than driving energy, the battery may be charged by some of engine output, which exceeds the engine output.

Accordingly, the battery input/output energy calculating processor 242 may calculate energy input to or output from a battery for each section in a procedure in which a powertrain of a hybrid vehicle manages driving energy for each section. To this end, the battery input/output energy calculating processor 242 may determine a driving strategy for each section in consideration of the driving energy and slope for each section, the average speed, the volume of traffic, or the like, may calculate battery input/output power through a difference between driving power for each section and engine output based on the determined driving strategy, and may calculate battery input/output energy based on the battery input/output power.

Similarly to FIG. 4, the SOC determining processor 243 may determine a start SoC in which a consumed SoC is minimized, i.e., an optimal start SoC in a predicted travel route based on battery input/output energy for each section, as described above, which will be described with reference to FIG. 8.

Figure 8:
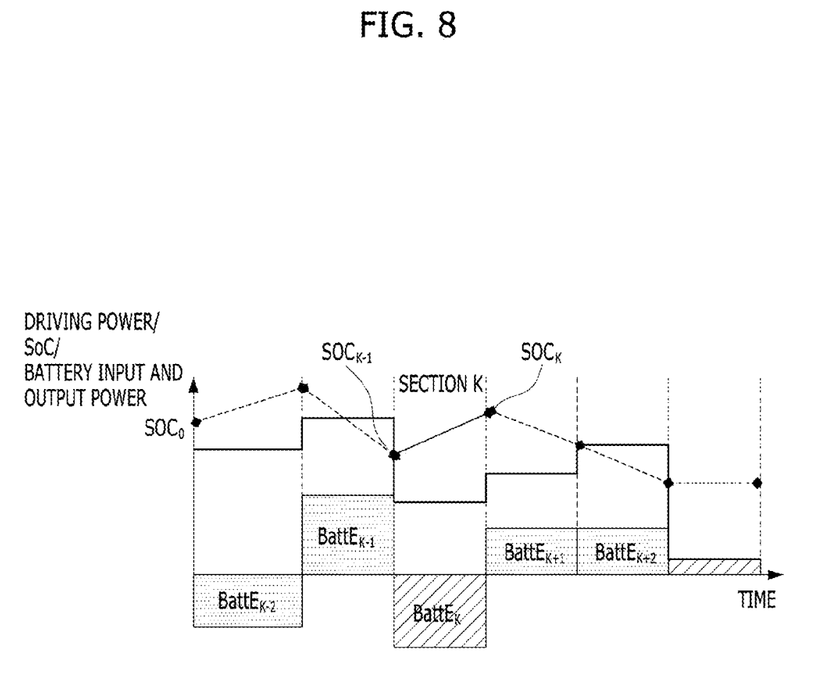
FIG. 8 is a diagram for explanation of change in an SoC of a battery as battery input/output energy for each section is sequentially applied according to an exemplary embodiment of the present disclosure.

FIG. 8 is a diagram for explanation of change in an SoC of a battery as battery input/output energy for each section is sequentially applied according to an exemplary embodiment of the present disclosure.

In the graph of FIG. 8, the horizontal axis indicates time and the vertical axis indicates the driving power and battery SoC for each section. Unlike in FIG. 6, the vertical axis also indicates battery input/output power. Here, SOC$_K$ represents an SoC when a K$^{th}$ section is terminated and SoC$_0$ represents a start SoC. Accordingly, SOC$_{K-1}$ may correspond to an SoC when the K$^{th}$ section begins. In addition, BattE$_k$ represents battery input and output energy in the K$^{th}$ section. Unlike the assumption in FIG. 4, at least some of driving power may be produced by driving an engine when driving along a predicted travel route, and thus the difference between driving power and engine output may correspond to battery input/output power, and the battery input and output energy for each section (i.e., an area for each section in the graph) may be the energy that is discharged from a battery and is output to the outside or is supplied to the battery from the outside to charge the battery.

Accordingly, the charge and discharge efficiency of the battery may be calculated in consideration of both charge and discharge. As described above, during discharge, energy that is consumed in an actual battery when corresponding energy is discharged to the outside may be obtained by multiplying the battery input and output energy $BattE_k$ by the reciprocal of the charge and discharge efficiency. For example, when the charge and discharge efficiency of a battery is 80% in the $K^{th}$ section, an SoC corresponding to energy of 1.25 kWh is consumed in an actual battery in order to supply energy of 1 kWh to a driving motor. In contrast, when charging, the energy that is charged in an actual battery when corresponding energy is supplied from the outside may be obtained by multiplying the battery input and output energy $BattE_k$ by the charge and discharge efficiency. For example, when the charge and discharge efficiency of a battery is 80% in the $K^{th}$ section, if energy of 1 kWh is supplied to the battery from a driving motor, the actual SoC of the battery may increase by 0.8 kWh.

In summary, an SoC when the $K^{th}$ section is terminated, i.e., $SoC_K$, may be a value obtained by summing $SOC_{K-1}$ which is the SoC when a previous $(K-1)^{th}$ section is terminated, by the SoC variation in the $K^{th}$ section. In this case, as described above, the SoC variation in the $K^{th}$ section may be a value obtained by multiplying the battery input and output energy $BattE_k$ of the corresponding section by the charge and discharge efficiency coefficient (i.e., which corresponds to BatteryEfficiency($SOC_{K-1}$) in Equation 1 above) corresponding to $SOC_{K-1}$. The charge and discharge efficiency coefficient may be the reciprocal of the charge and discharge efficiency, corresponding to $SOC_{K-1}$, during discharge, and may be the charge and discharge efficiency corresponding to $SOC_{K-1}$ during charge. In addition, when Equation 1 above is applied, a positive sign may be applied to $BattE_k$ during discharge and a negative sign may be applied thereto while charging.

As seen from FIG. 8, in sections K−2 and K, engine output exceeds section driving power and thus a battery is charged by the extra output, and the battery is discharged in the other sections. As seen from the drawing, it is predicted that, in sections K−1, K+1, and K+2, both an engine and a motor generate output (e.g., motor assist), and in the last section, only the motor outputs driving force. In this case, according to Equation 2 above, the SoC determining processor 243 may also determine a start SoC in which a consumed SoC is minimized, i.e., an optimal start SoC for a predicted travel route.

Hereinafter, a form in which the determined optimal start SoC is output to be checked by a driver will be described in detail with reference to FIG. 9.

Figure 9:
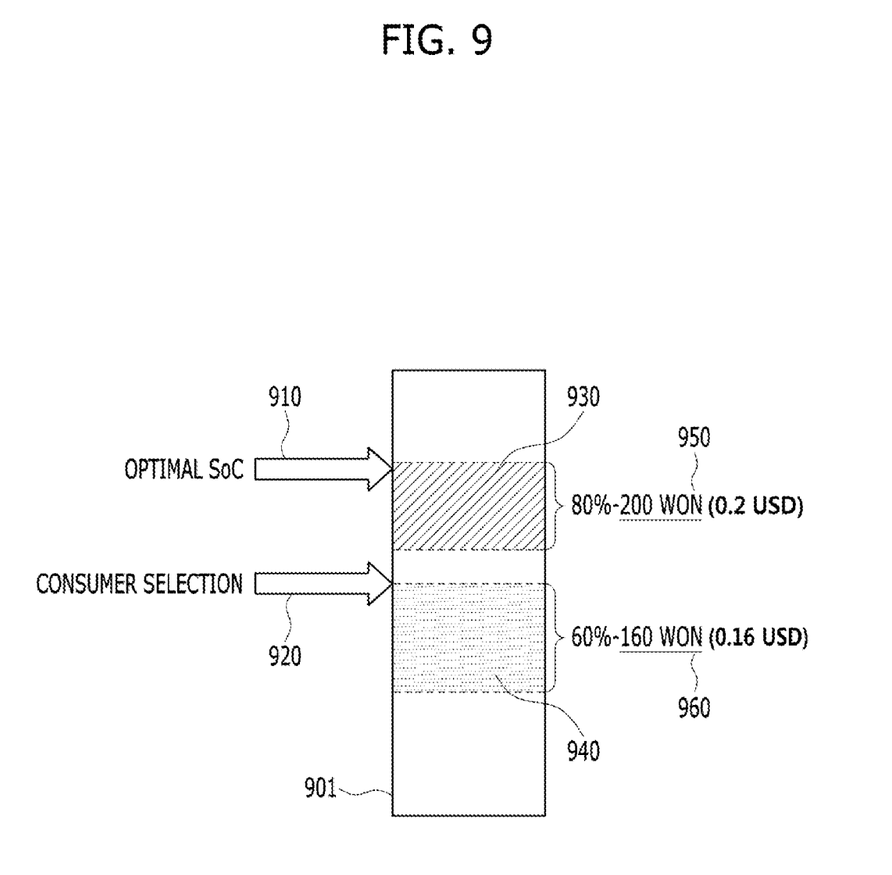
FIG. 9 is a diagram showing an example of a form in which guidance for a target charging amount is provided based on an optimal start SoC according to an exemplary embodiment of the present disclosure.

FIG. 9 is a diagram showing an example of a form in which guidance for a target charging amount is provided based on an optimal start SoC according to an exemplary embodiment of the present disclosure.

The guidance information shown in FIG. 9 may be displayed through at least one of the display elements included in a vehicle. The display elements included in the vehicle may be a cluster, a display of an AVN system, a head up display (HUD), or the like, but are not limited thereto.

Referring to FIG. 9, various pieces of guide information may be displayed based on an SoC bar 901. In detail, a first indicator 910 indicating an optimal start SoC determined by the SoC determining processor 243 and a second indicator 920 indicating an SoC corresponding to a target SoC that is currently selected or was selected in the past by a consumer (i.e., a driver) may be displayed. When the corresponding indicators 910 and 920 correspond to a start SoC, SoC amounts 930 and 940 consumed in the predicted travel route may also be displayed, respectively. In addition, information on a difference 950 between an SoC corresponding to a full charge and an SoC consumed when a battery is charged up to an optimal SoC, and a difference 960 between the optimal SoC and an SoC consumed when the battery is charged up to an SoC selected by a consumer may also be displayed. That is, referring to FIG. 9, when the battery is charged by as much as the optimal SoC compared with a full charge and a vehicle travels along a predicted travel route, an SoC consumption decrease corresponding to 200 won (0.2 USD) is achieved by virtue of use of optimal battery charge and discharge efficiency for each section, and when the battery is charged by as much as the SoC selected by a consumer, an SoC consumption increase corresponding to 160 won (0.16 USD) results compared with the optimal SoC. The difference may be calculated according to "(SoC consumption amount when optimal SoC is applied-SoC consumption amount when consumer selection (or full charge) SoC is applied)*charging costs per SoC", but the present disclosure is not limited thereto.

Information on a start SoC corresponding to optimal SoC consumption, i.e., a target charging amount for a predicted travel route, may be provided to a user via the above guidance, and the user may reduce charging costs based on the information.

The eco-friendly vehicle according to at least one embodiment as configured above may guide a target charging amount using an SoC section having optimal charge and discharge efficiency when a vehicle travels along a provided predicted route.

A person in the ordinary skill in the art would recognize that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a Hard Disk Drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of providing guidance for a charging amount of an eco-friendly vehicle to be charged by an external charger, the method comprising:
   predicting a driving energy for each section of a predicted travel route that is divided by a plurality of sections;
   calculating a battery input and output energy for each section of the predicted travel route based on the driving energy for each section; and
   determining a start SoC, as an initial SoC for the travel route, for minimizing a total change amount of an SoC that is sequentially changed in a section order when driving along the predicted travel route by applying a charge and discharge efficiency of a battery depending on a current SoC of the battery at each section to the battery input and output energy for each section.

2. The method of claim 1, wherein the calculating includes calculating the battery input and output energy for each section of the predicted travel route based on a difference between an engine output and a driving power for each section corresponding to the driving energy for each section.

3. The method of claim 1, wherein the predicting includes:
dividing the predicted travel route into the plurality of sections based on at least one of destination information, traffic information, or slope information, and
predicting the driving energy for each section of the predicted travel route.

4. The method of claim 3, wherein the determining includes:
calculating the total change amount of the SoC with respect to each of a plurality of different candidate start SoCs; and
determining the start SoC in which the total amount of the SoC is minimized among the plurality of different candidate start SoCs.

5. The method of claim 4, wherein the determining further includes calculating a SoC variation for each section of the predicted travel route by multiplying a charge and discharge efficiency coefficient corresponding to a last SoC of a previous section and a battery input and output energy of a corresponding section.

6. The method of claim 5, wherein the determining further includes calculating the total change amount of the SoC by summing the SoC variation for each section of the predicted travel route.

7. The method of claim 5, wherein the charge and discharge efficiency coefficient corresponds to the charge and discharge efficiency when the battery input and output energy of the corresponding section of the predicted travel route corresponds to charge, and the charge and discharge efficiency coefficient corresponds to a reciprocal of the charge and discharge efficiency when the battery input and output energy of the corresponding section of the predicted travel route corresponds to discharge.

8. The method of claim 5, wherein the battery input and output energy of the corresponding section of the predicted travel route has a negative sign in a case of charge, and has a positive sign in a case of discharge.

9. The method of claim 1, further comprising displaying information on the start SoC.

10. The method of claim 9, wherein the information on the start SoC includes at least one of first information indicating the start SoC, second information indicating an energy consumption amount when the vehicle travels along the predicted travel route after the vehicle is charged in the start SoC, or third information indicating a difference in charging costs when the vehicle travels with the start SoC compared with a full charge, respectively.

11. The method of claim 10, wherein the difference in the charging costs is calculated by multiplying a charging cost and a value obtained by subtracting the energy consumption amount when the vehicle travels along the predicted travel route in a case of the full charge from the energy consumption amount when the vehicle travels along the predicted travel route after the vehicle is charged in the start SoC.

12. The method of claim 10, wherein the information on the start SoC further includes at least one of fourth information indicating a target SoC selected by a user, fifth information indicating the energy consumption amount when the vehicle travels along the predicted travel route after the vehicle is charged in the target SoC, or sixth information indicating the difference of the charging costs when the vehicle travels in the target SoC compared with the start SoC.

13. A non-transitory computer readable recording medium having recorded thereon a program for executing the method of claim 1.

14. An apparatus for providing guidance for a charging amount of an eco-friendly vehicle to be charged by an external charger, the apparatus comprising a controller configured to:
predict a driving energy for each section of a predicted travel route that is divided by a plurality of sections,
calculate a battery input and output energy for each section of the predicted travel route based on the driving energy for each section, and
determine a start SoC, as an initial SoC for the travel route, for minimizing a total change amount of an SoC that is sequentially changed in a section order when driving along the predicted travel route by applying a charge and discharge efficiency of a battery depending on a current SoC of the battery at each section to the battery input and output energy for each section.

15. An eco-friendly vehicle comprising a controller configured to:
predict a driving energy for each section of a predicted travel route that is divided by a plurality of sections,
calculate a battery input and output energy for each section of the predicted travel route based on the driving energy for each section,
determine a start SoC, as an initial SoC for the travel route, for minimizing a total change amount of a SoC that is sequentially changed in a section order when driving along the predicted travel route by applying a charge and discharge efficiency of a battery depending on a current SoC of the battery at each section to the battery input and output energy for each section, and
control to output information on the start SoC,
wherein the start SoC corresponds to a target SoC to be charged by an external charger.

* * * * *